US009963965B2

(12) United States Patent
Saed (10) Patent No.: US 9,963,965 B2
(45) Date of Patent: May 8, 2018

(54) METHODS AND SYSTEMS FOR TELEMETRY OVER A DRILL STRING USING CONCURRENT ACOUSTIC SUB-BANDS (71) Applicant: COLD BORE TECHNOLOGY INC., Calgary (CA)

(72) Inventor: Aryan Saed, Maple Ridge (CA)

(73) Assignee: Cold Bore Technology Inc., Langley, British Columbia (CA)

(*) Notice: Subject to any disclaimer, the term of this patent is extended or adjusted under 35 U.S.C. 154(b) by 0 days. days.

(21) Appl. No.: 15/331,426

(22) Filed: Oct. 21, 2016

(65) Prior Publication Data
US 2017/0138184 A1 May 18, 2017

Related U.S. Application Data (63) Continuation of application No. PCT/CA2015/050329, filed on Apr. 21, 2015.

(60) Provisional application No. 61/982,849, filed on Apr. 22, 2014.

(51) Int. Cl.
E21B 47/16 (2006.01)

(52) U.S. Cl.
CPC .................. E21B 47/16 (2013.01)

(58) Field of Classification Search
CPC ......... E21B 47/16; B66C 13/46; B66C 23/54; E04G 21/0436; E04G 21/0463; G01D 5/145
USPC ........................................................ 340/854
See application file for complete search history.

(56) References Cited

U.S. PATENT DOCUMENTS

| 9,133,708 B2* | 9/2015 | Conn ........................ G01F 1/34 |
| 2002/0101359 A1 | 8/2002 | Huckaba et al. |
| 2002/0140572 A1 | 10/2002 | Gardner et al. |
| 2005/0104743 A1 | 5/2005 | Ripolone et al. |
| 2014/0247141 A1* | 9/2014 | Proud ...................... H02J 50/10 340/870.02 |
| 2015/0195839 A1* | 7/2015 | Yu ........................ H04B 1/7143 370/329 |
| 2016/0069180 A1* | 3/2016 | Zeller .................. E21B 47/122 340/854.4 |
| 2016/0209538 A1* | 7/2016 | Wang ....................... G01V 1/48 |
| 2016/0238720 A1* | 8/2016 | Gao ........................ E21B 47/16 |
| 2016/0265349 A1* | 9/2016 | Saulnier .............. H04L 25/0202 |

FOREIGN PATENT DOCUMENTS

| CA | 2413984 A1 | 12/2001 |
| CA | 2476259 A1 | 8/2003 |
| CA | 2685688 A1 | 5/2010 |
| WO | WO2014120988 A1 * | 8/2014 |

* cited by examiner

Primary Examiner — Hirdepal Singh
(74) Attorney, Agent, or Firm — Todd A. Rattray; Oyen Wiggs Green & Mutala LLP (57) ABSTRACT A method for transmitting data in a frequency selective communication channel in provided. The method comprises: parsing data to be transmitted into a plurality of data fields; assigning the data from each data field into a corresponding one of a plurality of sub-channels; modulating the data from each of the plurality of sub-channels into a corresponding one of a plurality of sub-bands, the plurality of sub-bands having spaced apart center frequencies; and concurrently transmitting the data from the plurality of sub-bands onto the channel.

29 Claims, 6 Drawing Sheets

METHODS AND SYSTEMS FOR TELEMETRY OVER A DRILL STRING USING CONCURRENT ACOUSTIC SUB-BANDS

REFERENCE TO RELATED APPLICATIONS

This application:
is a continuation of Patent Cooperation Treaty application No. PCT/CA2015/050329 filed 21 Apr. 2015 and entitled METHODS AND SYSTEMS FOR TELEMETRY OVER A DRILL STRING USING CONCURRENT ACOUSTIC SUB-BANDS, which is hereby incorporated herein by reference; and
claims the benefit of the priority of U.S. application No. 61/982,849 filed 22 Apr. 2014 and entitled Methods and Systems for Telemetry Over a Drill String Using Concurrent Acoustic Sub-bands, which is also hereby incorporated herein by reference.

TECHNICAL FIELD

The invention relates to drilling. Particular embodiments provide methods and systems for communication (e.g. telemetry) along a drill string.

BACKGROUND

Wells of the type commonly used for fossil fuel exploration and extraction and the like are often several kilometers deep. Typically, these wells or "boreholes" are drilled using pipes (often referred to as "drill strings") assembled from sections (often referred to as "pipe stands") connected end-to-end by suitable connection joints. Pipe stands may be about 30 to 45 feet long. To form a borehole, the drill string is rotated such that a drill bit attached to its "downhole" (or operative) end bites into the earth. Additional pipe stands are typically added to the "uphole" (or surface) end of the drill string as the borehole deepens.

Fluid, often referred to as "drilling mud" is typically pumped through an axial bore in the drill string from the surface to the downhole end of the drill string. The drilling mud typically exits the drill string at the downhole end and returns to the surface through the space between the drill string and the borehole. The drilling mud may cool and lubricate the drill bit, power the drill bit (e.g. through hydrodynamic pressure), provide a deposit on the borehole wall to seal the formation, and remove debris from the borehole.

There is a general desire to communicate information from a downhole location of the drill string (e.g. at or near the drill bit) to an uphole location (e.g. a surface location at or near the opening of the borehole). Such communication may permit monitoring of one or more sensors at the downhole location and may also permit control of the drilling operation (e.g. steering, drilling fluid pump parameters, rotational speed and/or the like) based on feedback received from such sensors. Such sensors (which are referred to as measurement while drilling (MWD) sensors) may sense characteristics of pipe string, the drill bit and/or the borehole. Examples of MWD sensor information may include temperature information, pressure information, incline orientation information, azimuthal orientation information, vibration information, drilling torque information and/or the like. In addition to sensor information, it may be desirable to communicate management information from the downhole location to the uphole location. By way of example, such management information may include information related to the sensor information (e.g. the amount of sensor data, the type of sensor data, the transmission order of sensor data and/or the like).

One technique which has been proposed for communicating MWD information from a downhole location to an uphole location involves acoustic telemetry through the drill string. The efficacy of acoustic telemetry depends on the channel through which the acoustic signal travels. In the case of acoustic telemetry through a drill string, the channel or transmission medium comprises the drill string itself, which may exhibit a variety of acoustic properties. In particular, because of the (typically) repetitive spacing of pipe stands and joints therebetween, there are spectral stop-bands (i.e. frequency bands of substantial attenuation) within the frequency spectrum associated with acoustic communication. Between these stop-bands, there are pass-bands which permit the transmission of acoustic energy.

In some circumstances, there is no mechanism for communication down the borehole—i.e. there is no mechanism to communicate information from the uphole location to the downhole location. Without the ability to communicate from the uphole location to the downhole location, it can be difficult to dynamically adapt transmission of MWD information or other information from the downhole location to the uphole location on the basis of information known only at the uphole location.

There is a general desire to communicate information from a downhole location of a drill string (e.g. at or near the drill bit) to an uphole location (e.g. a surface location at or near the opening of the borehole).

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for transmitting data in a frequency selective communication channel having pass-bands and stop-bands. The method comprises: parsing data to be transmitted into a plurality of data fields; assigning the data from each data field into a corresponding one of a plurality of sub-channels; modulating the data from each of the plurality of sub-channels into a corresponding one of a plurality of sub-bands, the plurality of sub-bands having spaced apart center frequencies; and concurrently transmitting the data from the plurality of sub-bands onto the channel.

Another aspect of the invention provides a communication system comprising a transmitter and a receiver for communicating data from the transmitter to the receiver over a frequency-selective communication channel comprising one or more pass-bands and one or more stop-bands. The communication system comprises a transmitter. The transmitter comprises: a receive component for interfacing with one or more data sources and receiving data to be transmitted; and a telemetry unit, the telemetry unit configured to: parse data to be transmitted into a plurality of data fields;

assign the data from each data field into a corresponding one of a plurality of sub-channels; modulate the data from each of the plurality of sub-channels into a corresponding one of a plurality of sub-bands, the plurality of sub-bands having spaced apart center frequencies; concurrently transmit the data from the plurality of sub-bands onto the channel.

Another aspect of the invention provides a method for transmitting data in a frequency selective communication channel having pass-bands and stop-bands. The method comprises: parsing data to be transmitted into a plurality of data fields; assigning the data from each data field into a corresponding one of a plurality of sub-channels; and, for each of a plurality of successive iterations: modulating the data from a current-iteration one of the plurality of sub-channels into a corresponding current-iteration one of a plurality of sub-bands, the plurality of sub-bands having spaced apart center frequencies, the current iteration one of the plurality of sub-channels and the current-iteration of the plurality of sub-bands different from those of preceding iterations; and transmitting the data from the current-iteration one of the plurality of sub-bands onto the channel.

Another aspect of the invention provides a communication system comprising a transmitter and a receiver for communicating data from the transmitter to the receiver over a frequency-selective communication channel comprising one or more pass-bands and one or more stop-bands. The communication system comprises a transmitter. The transmitter comprises: a receive component for interfacing with one or more data sources and receiving data to be transmitted; and a telemetry unit configured to: parse data to be transmitted into a plurality of data fields; assign the data from each data field into a corresponding one of a plurality of sub-channels; and for each of a plurality of successive iterations: modulate the data from a current-iteration one of the plurality of sub-channels into a corresponding current-iteration one of a plurality of sub-bands, the plurality of sub-bands having spaced apart center frequencies, the current iteration one of the plurality of sub-channels and the current-iteration of the plurality of sub-bands different from those of preceding iterations; and transmit the data from the current-iteration one of the plurality of sub-bands onto the channel.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One technique which has been proposed for communicating MWD information from a downhole location to an uphole location involves acoustic telemetry through the drill string itself. In such circumstances, the acoustic propagation channel comprises stop-bands and pass-bands. For the purposes of this description and the accompanying claims, a pass-band may be considered to be a contiguous region of the channel spectrum (i.e. a contiguous frequency domain region) around a local maximum of the magnitude response of the channel where the channel magnitude response is within 15 dB of the local maximum. A stop-band may be considered to be a region of the channel spectrum (i.e. a frequency domain region) which is not in a pass-band. In some embodiments or applications, the communication system may be a unidirectional communications link from a transmitter at the downhole location to a receiver at the uphole location. In such unidirectional systems, the uphole receiver cannot communicate information to the downhole transmitter about the precise frequency-domain location locations of pass-bands or stop-bands in the acoustic frequency spectrum.

Figure 5:
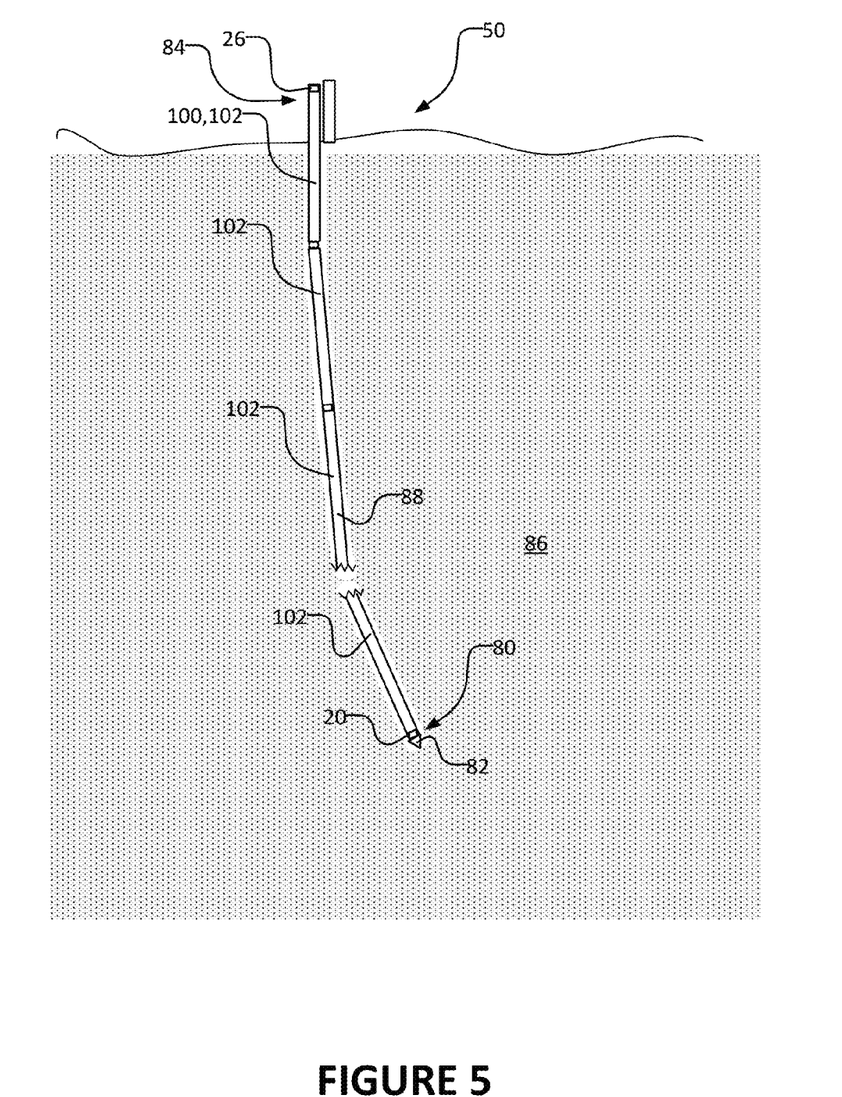
FIG. 5 is a schematic depiction of a drill string comprising a plurality of pipe stands and a telemetry system and corresponding communication methods according to a particular embodiment.

FIG. 5 is a schematic depiction of a drill string 100 comprising a plurality of pipe stands 102 and a telemetry communication system 50 (and corresponding communication methods) according to a particular embodiment. Telemetry communication system 50 of the FIG. 5 embodiment comprises a transmitter 20 which is located at a downhole location 80 (i.e. a location relatively close to the drill bit 82) and a receiver 26 which is located at an uphole location 84 (i.e. a location relatively far from drill bit 82). In the illustrated embodiment, receiver 26 is located above ground 86, although this is not necessary. Transmitter 20 receives data from data sources (not expressly shown in FIG. 5) and communicates that data up drill string 100 to receiver 26. While such data sources could generally include any data source, it is envisaged that in some embodiments, such data sources will include information from tools and/or sensors related to the drilling operation. In particular embodiments, transmitter 20 uses suitable transducers (e.g. electromechanical transducers—not expressly shown) to transmit an acoustic signal carrying the data along drill string 100—i.e. such that drill string 100 itself provides an acoustic communication channel 88 between transmitter 20 and receiver 26. Receiver 26 may receive the acoustic signal from drill string 100 (i.e. acoustic channel 88) and extract the data from the data sources, such that this data is available at uphole location 84. In some embodiments, telemetry communication system 50 is unidirectional in the sense that data is only communicated from transmitter 20 to receiver 26 (and not in reverse). This is not necessary, however, and in some embodiments, receiver 26 may communicate information to downhole transmitter 20, though acoustic channel 88 or otherwise.

During drilling operations, as pipe stands 102 are added to drill string 100 (or removed from drill string 100) and/or for a variety of other reasons, the acoustic properties of drill string 100 (and the corresponding acoustic channel 88) change over time. For example, the frequency-domain locations of the pass-bands and/or stop-bands may change over time. It is expected that the passbands of channel 88 will become narrower and may shift locations in the frequency domain as the downhole location 80 of transmitter 20 gets further away from the uphole location 84 of receiver 26 (e.g. as drill bit 82 gets deeper into ground 86 or as pipe stands 102 are added to drill string 100).

Aspects of the invention provide for acoustic transmission of data from a transmitter at a downhole location to a receiver at an uphole location in a broadband fashion, whereby data is transmitted over a band spanning multiple pass-bands. Thus the data can be received in a pass-band, even when the precise frequency-domain location of the pass-band is not known. At the receiver, the signal may be received as a composition of transmissions through one or more pass-bands, the frequency-domain locations of which are not precisely known to the transmitter.

Figure 1:
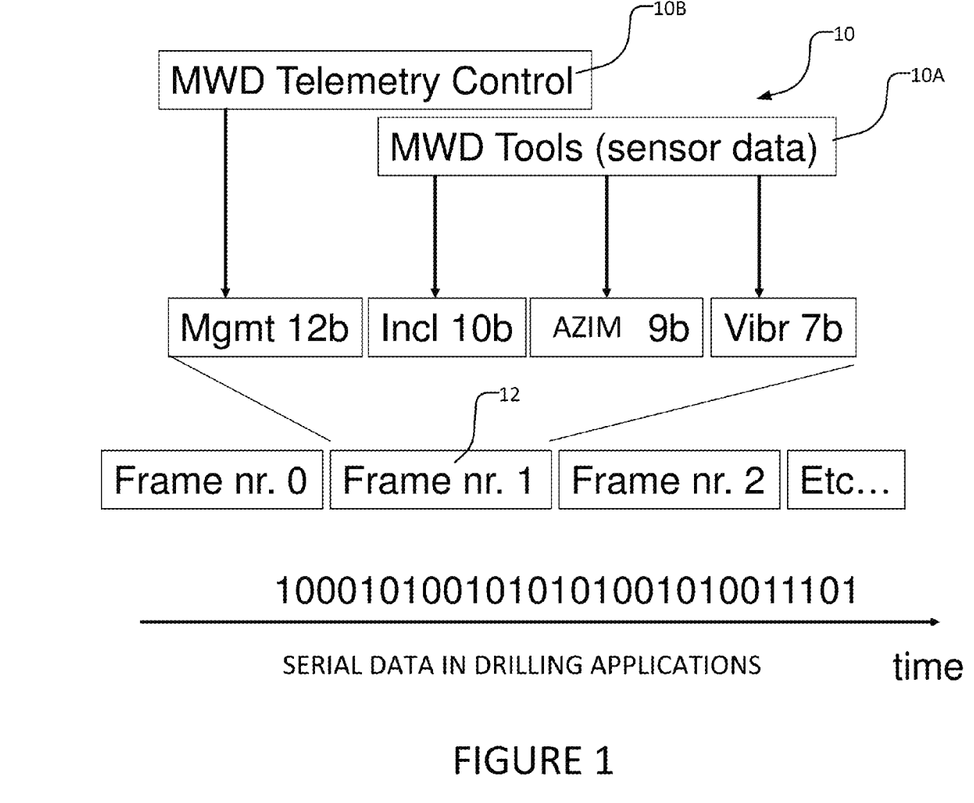
FIG. 1 shows a non-limiting example of how MWD information may be packaged into a data frame according to a non-limiting example embodiment.

FIG. 1 shows a non-limiting example of how MWD information 10 (including tool (e.g. sensor) data 10A and/or management data 10B) may be packaged into a data frame 12 according to a non-limiting example embodiment. A simplified frame in this example comprises a 12 bit management word, a 10 bit tool incline reading, a 9 bit tool azimuth reading, and a 7 bit reading of the tool vibration. In some embodiments, a frame 12 may comprise any type of data 10 (e.g. MWD data, such as, by way of non-limiting example, other tool data such as temperature data, gamma readings, other types of information that would be desirably sent from a downhole location to an uphole location and/or the like). References herein to data for a tool should be understood to include data relating to any tool used in connection with the drilling operation or data from any sensor used in connection with the drilling operation. In general, however, frame 12 may comprise data from any suitable data source. In some embodiments, the word length of each data element within frame 12 may be configured for other sizes (e.g. in the range 7 to 12 bits and/or the like). In some embodiments, the length of a particular frame 12 may vary. In the FIG. 1 example, the frame format and frame length is constant from frame to frame, and a data element from a tool is included once per frame. This is not necessary. In some embodiments, some tools may provide multiple data elements per frame and some may provide data elements once per several frames. The content of the management word within frame 12 may contain any of a variety of information, including, by way of non-limiting example, utility and control bits, information relating to frame format, frame size, frame synchronization patterns, parity bits and/or the like.

In prior art MWD telemetry systems, the frame data is transmitted serially by means of a sequential train of mud pulses, electromagnetic waves, acoustic chirps or other acoustic pulses and is tuned to a single pass-band at or near the mechanical resonance frequency of the transmitter such that the system is mechanically resonant in that pass-band. In the prior art, such serial data may be modulated by amplitude shift keying (ASK), phase shift keying (PSK) or frequency shift keying (FSK) in attempt to overcome the frequency selectiveness or other limitations of the transmission channel. This serial transmission yields a sequential train of modulated waves that are carried by the transmission medium. The transmission medium may comprise drilling fluid (for mud pressure telemetry), drill formations (for electromagnetic telemetry), or drill pipe (for acoustic telemetry).

Figure 2:
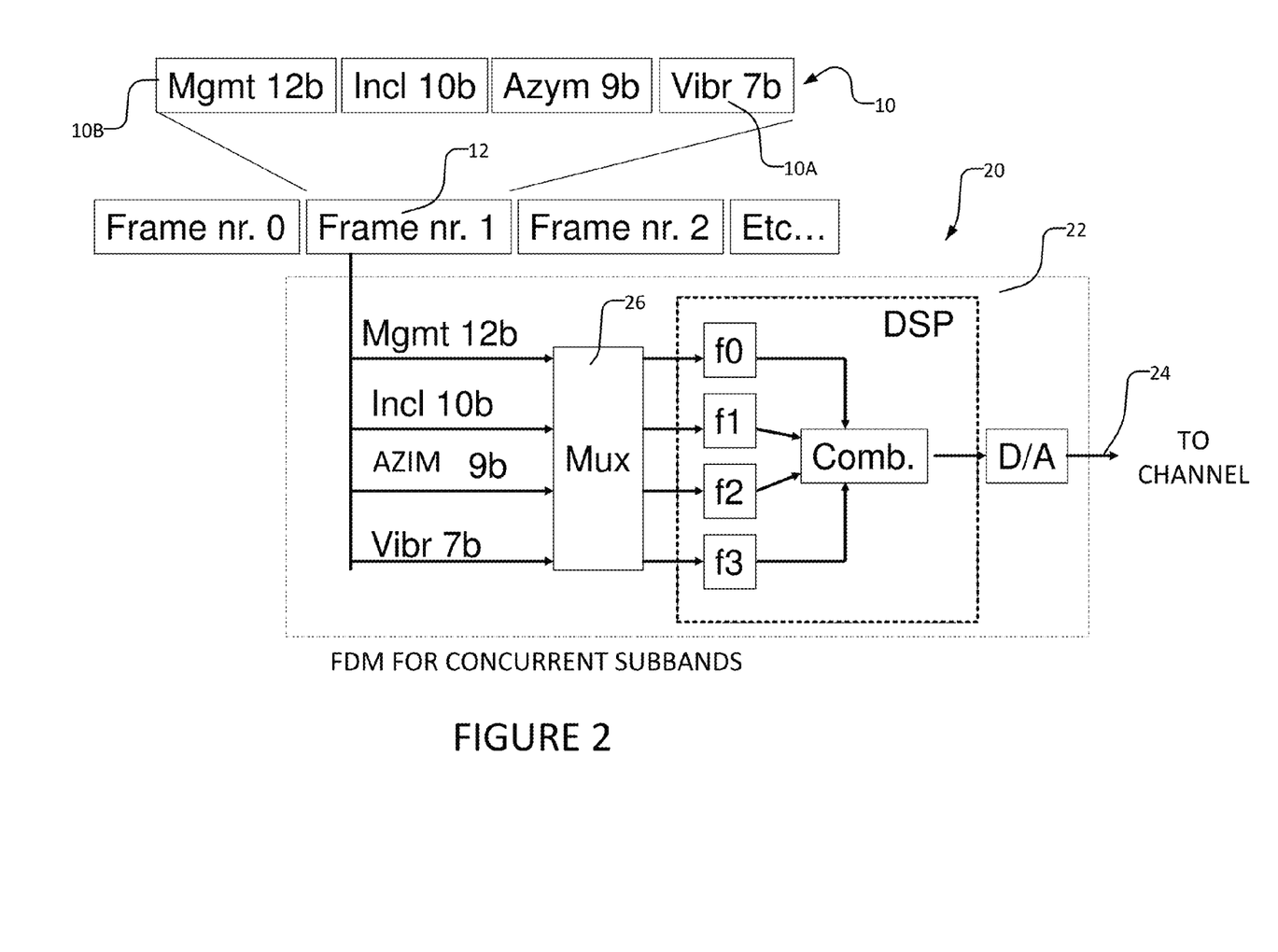
FIG. 2 schematically shows a transmitter located at a downhole location transmitting data using a Frequency Division Multiplexing (FDM) technique over multiple concurrent sub-bands according to a particular example embodiment.

FIG. 2 schematically shows a transmitter 20 located at a downhole location 80 transmitting data 10 using a Frequency Division Multiplexing (FDM) technique over multiple concurrent sub-bands (referenced by their modulation frequencies (f0 . . . f3)) according to a particular example embodiment. In the FIG. 2 embodiment, data 10 from each tool/sensor is supplied to a telemetry unit 22 (part of transmitter 20) for modulation into a corresponding sub-band. Telemetry unit 22 shown in the illustrated embodiment provides an analog output signal 24 which is transmitted over the channel (e.g. an acoustic channel comprising the drill string itself—not shown). As will be appreciated by those skilled in the art, analog signal 24 may be used by suitably configured hardware (e.g. amplifiers, electric-to-acoustic transducers and/or the like—not shown) to transmit a signal corresponding to analog signal 24 over the channel. This modulation of data 10 from each tool/sensor into a corresponding sub-band is exemplified in Table 1, for the example frame 12 shown in FIG. 2.

In particular, in the non-limiting example shown in FIG. 2 and in Table 1, the management bits (b0 . . . b11) are modulated onto sub-band f0, incline tool bits (b12 . . . b21) are modulated onto sub-band f1, azimuth tool bits (b22 . . . b30) are modulated onto sub-band f2 and vibration tool bits (b31 . . . b37) are modulated onto sub-band f3. To facilitate this division, each frame 12 may be parsed (e.g. by telemetry unit 22) to extract data from each individual tool/sensor. Additionally or alternatively, the data corresponding to each tool/sensor may be supplied to telemetry unit 22 via a distinct hardware connection, via a distinct data field in a software application program interface (API) and/or the like. In the particular case of the non-limiting example shown in FIG. 2 and Table 1, four sub-channels of data, each comprising data from a corresponding tool/sensor or management data, are mapped to four corresponding sub-bands (f0 . . . f3) of the acoustic channel 88. Each sub-band (f0 . . . f3) may be mapped to a corresponding pass-band of the acoustic channel 88 (e.g. where transmitter 20 has access to (or is configured on the basis of) estimates of the frequency-domain locations of the pass-bands. For example, transmitter 20 may be configured to tune sub-band modulation center frequencies (f0 . . . f3) to the estimated pass-band centers of the channel 88 (or to estimates of where the pass-band centers may be located), if such pass-band estimates are known to transmitter 20. Transmitter 20 may have estimates of the frequency-domain locations of pass-bands of the channel 88, if estimates of their frequency-domain locations are known before drilling commences (e.g.

through collection of empirical data from the same or similar drilling pipe). In some embodiments, transmitter 20 may have access to the estimated frequency-domain locations of pass-bands through feedback (e.g. from receiver 26), which may be communicated to downhole transmitter 20 by means of acoustic channel 88 or some other communication channel. It will be appreciated that the four sub-bands and four data sub-channels corresponding to four tools/sensors or management data are merely exemplary numbers and that in some embodiments, transmitter 20 and or telemetry unit 22 may use different numbers of sub-bands and data sub-channels.

TABLE 1

Mapping a Frame of 4 Fields (38 bits) to 4 Sub-bands

| Field | Frame bit numbers | Sub-band allocation |
|---|---|---|
| Management (12 bits) | b0 . . . b11 | Sub-band f0 |
| Incline (10 bits) | b12 . . . b21 | Sub-band f1 |
| Azimuth (9 bits) | b22 . . . b30 | Sub-band f2 |
| Vibration (7 bits) | b31 . . . b37 | Sub-band f3 |

In some embodiments, instead of extracting or parsing individual tool data from frame 12, frames 12 may be segmented into sub-frames or frame segments. This is exemplified in Table 2, for the example frame 12 shown in FIG. 2. In accordance with the example frame 12 comprising of four fields and a total of 38 bits (12 management bits (b0 . . . b11)+10 incline bits (b12 . . . b21)+9 azimuth bits (b22 . . . b30)+7 vibration bits (b31 . . . b37)), frame 12 is segmented into 4 sub-frames of 10 bits each. Pad bits (e.g. each valued 0) may be used to provide sub-bands (f0 . . . f3) with equal numbers of bit assignments. In the particular case of the non-limiting example shown in FIG. 2 and Table 2, four sub-channels of data, each comprising a frame segment of 10 bits, may be mapped to four sub-bands (f0 . . . f3) of the acoustic channel 88. Each sub-band (f0 . . . f3) may be mapped to a corresponding pass-band of the acoustic channel 88 (e.g. where transmitter 20 has access to (or is configured on the basis of) estimates of the frequency-domain locations of the pass-bands. For example, transmitter 20 may be configured to tune sub-band modulation center frequencies (f0 . . . f3) to the estimated pass-band centers of the channel 88 (or to estimates of where the pass-band centers may be located), if such pass-band estimates are known to transmitter 20. Transmitter 20 may have estimates of the frequency-domain locations of pass-bands of the channel 88, if estimates of their frequency-domain locations are known before drilling commences (e.g. through collection of empirical data from the same or similar drilling pipe). In some embodiments, transmitter 20 may have access to the estimated frequency-domain locations of pass-bands through feedback (e.g. from receiver 26), which may be communicated to downhole transmitter 20 by means of acoustic channel 88 or some other communication channel. It will be appreciated that the four sub-bands and four data sub-channels corresponding to four tools/sensors or management data are merely exemplary numbers and that in some embodiments, transmitter 20 and or telemetry unit 22 may use different numbers of sub-bands and data sub-channels.

TABLE 2

Segmenting a Frame of 38 bits and mapping it onto 4 Sub-bands

| Fame Segment | Sub-band allocation |
|---|---|
| b0 . . . b9 (10 frame bits) | Sub-band f0 |
| b10 . . . b19 (10 frame bits) | Sub-band f1 |
| b20 . . . b29 (10 frame bits) | Sub-band f2 |
| b30 . . . b39 (8 frame bits + 2 pad bits) | Sub-band f3 |

Transmission in sub-bands (f0 . . . f3) may be accomplished by telemetry unit 22 using Frequency Division Multiplexing (FDM), as shown in the illustrated embodiment of FIG. 2, and telemetry unit 22 may provide the sub-band modulation for each sub-channel by digital up-conversion using a digital frequency synthesizer (not expressly shown). The data of each sub-channel may be modulated using Frequency, Amplitude or Phase Shift Keying (FSK, ASK, PSK), for example, and the resultant baseband signal may be up-converted to the desired acoustic sub-band. In some applications and/or embodiments, the frequency-domain width of a sub-band may be considered to be the frequency-domain distance between the two frequencies (above and below the center frequency of the sub-band) at which the transmission power is less than center frequency by 10 dB. A sub-band may be said to be limited to its frequency-domain width and two sub-bands may be described as being spaced apart from one another in the frequency domain if their respective widths (or locations) are non-overlapping in the frequency domain. In some embodiments, each of sub-bands (f0 . . . f3) may have a width in a range of 10 Hz-100 Hz, and may be spaced apart from one another in the frequency domain by one to several hundred (e.g. 200) Hz.

The concurrent acoustic transmission of data over multiple sub-bands of an acoustic channel 88 provided by a drill string 100 (where the multiple sub-bands are spaced apart from one another in the frequency domain) contrasts with prior art techniques, which attempt to transmit into a single pass-band of the acoustic channel 88 and attempt to optimize the acoustic transmission to be resonant with the mechanical system used to transmit the acoustic energy into the drill string 100. In some embodiments of the current invention, the sub-bands used for concurrent transmission are well below the natural resonant frequency of the mechanical acoustic transmission system. For example, in a typical prior art acoustic drill string communication system, the prior art system attempts to acoustically transmit data into a single pass-band at or near the resonant frequency of the mechanical acoustic transmission system.

In contrast, embodiments of the present invention involve transmission into multiple spaced apart (in the frequency-domain) pass-bands, all of which are significantly less than the natural resonant frequency of the mechanical acoustic transmission system. In some embodiments of the present invention, the highest sub-band center frequency (or the highest frequency within the highest sub-band) used by transmitter 20 is less than half of the natural resonant frequency of the mechanical acoustic transmission system. In some embodiments, this ratio is less than one third. As another example, in some embodiments, the highest sub-band center frequency (or the highest frequency within the highest sub-band) used by transmitter 20 is less than the natural resonant frequency of the mechanical acoustic transmission system by at least 1 kHz. In some embodiments, this frequency-domain separation is at least 2.5 kHz.

In accordance with the illustrated FIG. 2 embodiment, telemetry unit 22 may combine the signals of the FDM sub-band channels and convert this combined signal into analog signal 24. The multi-band analog signal 24 may then be amplified and launched into the drill string 100 by means of electromechanical transducers such as piezo-electric or magnetostrictive elements (not shown). In the illustrated embodiment of FIG. 2, multiplexer (MUX) 26 may be used to assign and reassign tool fields (in the embodiment of Table 1) or frame segments (in the embodiment of Table 2) to different sub-bands, thereby allowing a rotation of the assignments, from frame to frame, as explained in more detail below.

The functionality of DSP 28 illustrated in the FIG. 2 example embodiment may be implemented by logic gates of one or more DSP circuits, a DSP software routine on one or more DSP processors, one or more general CPUs and/or the like. Appropriate filtering and pulse shaping known to those skilled in the art (not expressly shown) may be provided to avoid interference between the FDM channels.

If estimates of the frequency-domain locations (e.g. widths) of pass-bands in acoustic channel are known to transmitter 20, then transmitter 20 may be configured (or may itself configure) the sub-channel frequency-domain characteristics (e.g. center frequency locations and/or widths of the sub-channels) to fit within the pass-bands of acoustic channel 88. For example, the frequency-domain width of the sub-bands can be set to be less than the frequency-domain width of some or all of the pass-bands. This can be accomplished, for example, by adjusting the data rate within each sub-band. In some embodiments, the data rate within each sub-band may be adjusted or selected based on an estimated frequency-domain width of the pass-band it is allocated to and/or based on an average estimated frequency-domain width of the pass-bands. For example, in a pass-band that is 100 Hz wide, a data rate of up to 200 bps or more may be transmitted. The channel impulse response and ensuing inter symbol interference (ISI), as well as noise may limit the transmission to a lower rate than is theoretically possible. Additionally or alternatively, in some embodiments, the data rate of some or all sub-bands may be set to be equal among each other. Setting the data rate of some or all sub-bands to be equal provides a practical benefit that data may be obtained from a frame (e.g. at receiver 26) and updated in lock step. The actual common bit rate selected may depend on the width of the narrowest pass-band in channel 88. For example, with a collection of suitable pass-bands that are in the range 80 Hz to 150 Hz wide, it may be practical to set the data rate in each sub-band to perhaps 20 bps. The data may be modulated (at the bit rate) using ASK, PSK, FSK or any other suitable modulation technique.

Some embodiments may employ orthogonal sub-carriers for data transmission. When employing orthogonal sub-carriers for data transmission, the interference between sub-channels may be practically eliminated. Additional Forward Error Correction (FEC) and/or checksums may be added to the data sub-channel corresponding to each sub-band.

Figure 2B:
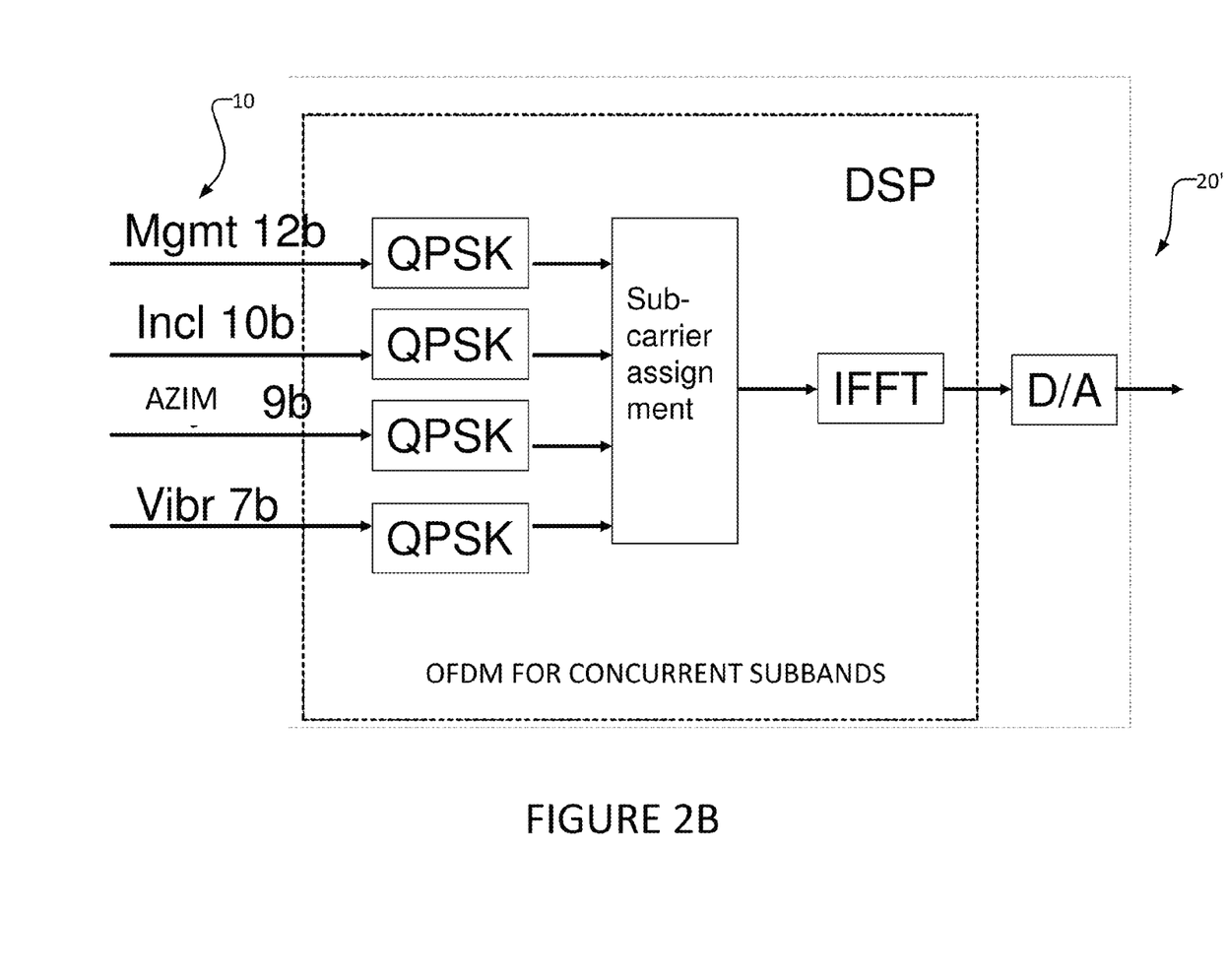
FIG. 2B schematically depicts a transmitter located at a downhole location transmitting data using a technique comprising sub-banding with orthogonal frequency division multiplexing (OFDM) according to an example embodiment.

FIG. 2B schematically depicts a transmitter 20' which may be used in communication system 50 according to another example embodiment. Transmitter 20' of the FIG. 2B embodiment is located at downhole location 80 and transmits data 10 using a technique comprising sub-banding with orthogonal frequency division multiplexing (OFDM). In accordance with the FIG. 2B embodiment, data 10 may be modulated by OFDM within the sub-channels. In such embodiments, multiple bits from a data sub-channel are modulated concurrently onto mutually orthogonal acoustic sub-carriers. For example, a sub-band that spans 650 Hz to 750 Hz is 100 Hz wide, and may carry 50 OFDM subcarriers with a spacing of DF=2 Hz. By choosing the subcarriers as integer multiples of DF=2 Hz, the sub carrier frequencies are N*DF with N=325 . . . 375 (in the exemplary case of a sub-band that spans 650-750 Hz) and are orthogonal.

In some embodiments, it is also practical to perform the FDM by means of OFDM. OFDM sub-carriers may be logically grouped into pluralities of OFDM sub-carriers and to thereby form sub-bands having similar frequency-domain widths to those discussed above in connection with the FIG. 2 embodiment and then such sub-bands may be assigned to known (or approximately known) pass-bands, as discussed above in connection with the FIG. 2 embodiment. FDM may be applied by switching select sub-carriers on and off dependent on the transmitted data bit.

In the embodiment shown in FIG. 2B, the functions of digital upconversion and combining the data from the different sub-channels may comprise performing an IFFT (Inverse Fast Fourier Transform) and/or the like.

As discussed above, in embodiments which make use of OFDM, neighboring OFDM subcarriers may be grouped (into pluralities of OFDM subcarriers) to thereby form sub-bands. As was the case with the FIG. 2 embodiment, such sub-bands may be assigned to pass-bands when estimates of the frequency-domain locations of the pass-bands are known (or approximately known) to transmitter 20'. Transmitter 20' may have estimates of the frequency-domain locations of pass-bands of the channel 88, if estimates of their frequency-domain locations are known before drilling commences (e.g. through collection of empirical data from the same or similar drilling pipe). In some embodiments, transmitter 20 may have access to the estimated frequency-domain locations of pass-bands through feedback (e.g. from receiver 26), which may be communicated to downhole transmitter 20 by means of acoustic channel 88 or some other communication channel. In some embodiments, all sub-carriers of all sub-bands may be chosen to be multiples of one base spacing, e.g. DF=2 Hz. This exemplary DF results in a FFT period of 0.5 s. For such a FFT period, a suitable OFDM cyclic prefix may be 100 ms, resulting in a OFDM symbol period of 0.6 s. Thus, at every OFDM symbol period, e.g. every 0.6 s, a new frame may be transmitted.

In some embodiments, to adapt the FIG. 2B OFDM physical layer functionality to a logical layer function of existing MWD products, the frame rate may be decoupled from the OFDM symbol rate, so that new frame data is transmitted at a frame rate that suits the existing tools/sensors. To this end, a longer frame may be broken up and transmitted in frame sections, each section occupying a separate OFDM symbol.

For example, an example acoustic band up to 10 KHz may be sampled at approximately fs=20 KHz and sub-divided into 10240 sub-carriers using a 10240-point IFFT. A sub-band that is 100 Hz wide may thus be activated by 50 contiguous sub-carriers, each sub-carrier being 2 Hz wide. The sub-band may be located at a known (or approximately known) pass-band, and may cover its spectral width. A multi-sub-band signal may be concurrently transmitted into multiple sub-bands at once. A multi-sub-band signal may be generated by an IFFT.

For the purpose of an OFDM transmission by IFFT, the data bits of a field (e.g. corresponding to a tool or a frame segment, for example) may be collected in pairs to form a QPSK symbol at the IFFT input, and multiple adjacent sub-carriers in a sub-band may be used to group the data bits from a field together into a sub-band. To transmit a 10 bit field, 5 subcarriers are activated from the available 50 in a 100 Hz sub-band. The remaining 45 subcarriers of the sub-band may be nulled or used for other fields of the frame. Remaining fields (which may be assigned to corresponding sub-channels) may be transmitted in other sub-bands in a similar way (i.e. a one to one correspondence between sub-channels and sub-bands) or in the same sub-bands in a similar way (i.e. multiple-sub-channels per sub-band).

Additional DSP functions (not shown) at the output of the IFFT may add a cyclic prefix, and perform any desired pulse shaping and filtering. In other respects, the OFDM embodiment of FIG. 2B may be similar to (and have features similar to) the embodiment shown in FIG. 2.

Figure 3:
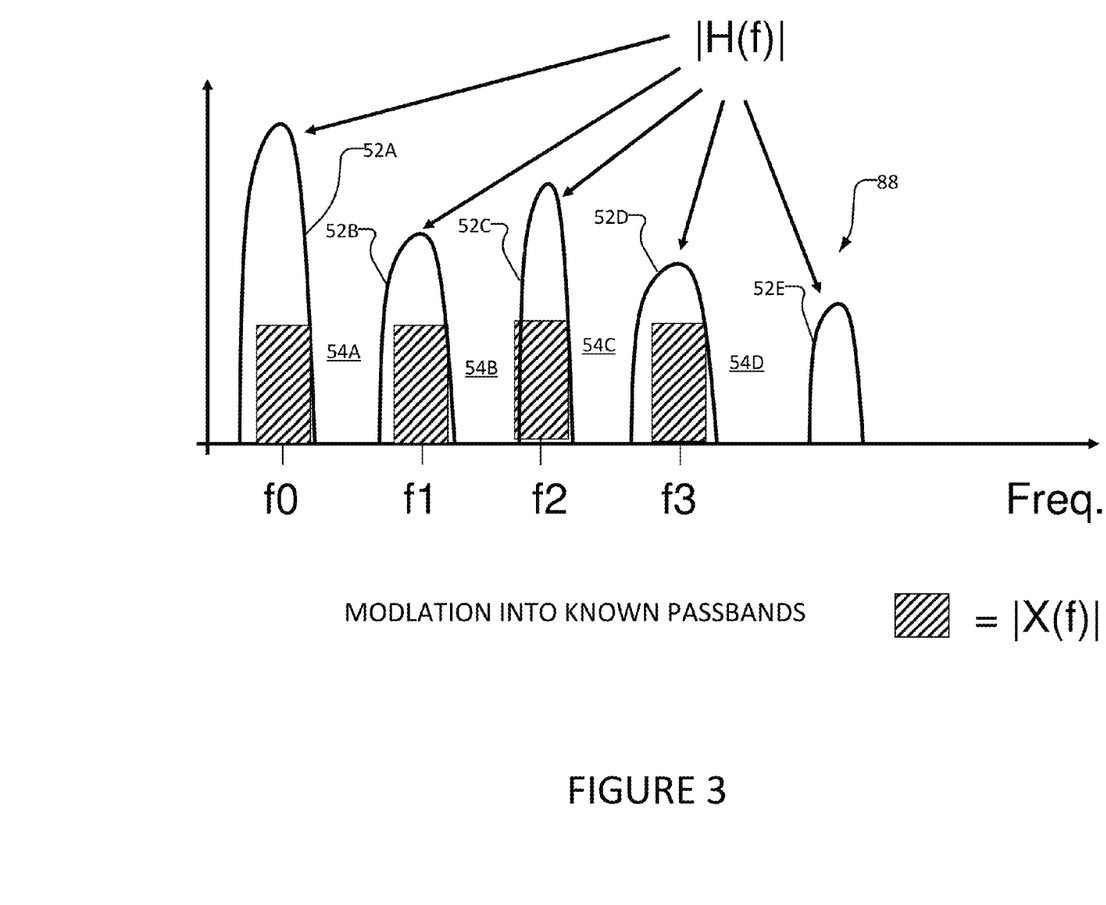
FIG. 3 is a schematic depiction of an acoustic channel having pass-bands and stop-bands representative of the acoustic channel of a pipe string and how a transmitter (e.g. one of transmitters of FIGS. 1 and 2) can map its sub-channels and sub-bands into the pass-bands of the channel, where the transmitter has some knowledge of the frequency location of the pass-bands.

FIG. 3 is a schematic depiction of an acoustic channel 88 having pass-bands 52A-52E (collectively, pass-bands 52) and stop-bands 54A-54D (collectively, stop-bands 54) representative of the acoustic channel of a pipe string and how a transmitter (e.g. one of transmitters 20, 20' described herein) can map sub-channels and sub-bands into pass-bands 52 based on estimates of the frequency-domain location of pass-bands 52—e.g. where pass-bands 52 can be determined or at least estimated to a reasonable degree and such estimates may be communicated back to receiver 20 or otherwise known to receiver 20. In applications or embodiments where estimates of the acoustic properties of the drill string channel 88 are known well enough to allow transmitter 20 to establish its pass-band characteristics (e.g. the frequency-domain locations of pass-bands 52) to within a suitable degree of accuracy, transmitter 20 may map its sub-bands to be centered within available pass-bands, as shown in FIG. 3.

In some embodiments, a feedback communication (e.g. feedback from an uphole location 84 to the downhole transmitter 20) may be used by communication system 50 to set or adjust the sub-band center frequencies and/or frequency-domain widths based on updated estimates of pass-band frequency-domain locations. Such estimates of the frequency-domain locations of pass-bands may change based on changing acoustic properties of acoustic channel 88 (e.g. drill string 100). Such estimates of pass-band frequency-domain locations may change, for example, as pipe stands 102 and drill subs are added or removed from string 100. DSP channel estimation algorithms may be employed (e.g. by receiver 26) to determine (at receiver 26) estimates of the frequency-domain locations of pass-bands based on received signals (e.g. signals received at receiver 26). In some embodiments, transmitter 20 may be configured to transmit into alternate sub-bands from time to time to assist receiver 26 with determining estimates of pass-band frequency-domain locations or to otherwise allow uphole receiver 26 to determine whether such sub-bands correspond to stop-bands of channel 88 or pass-bands of channel 88 available to be configured as sub-bands for data transmission.

Figure 4:
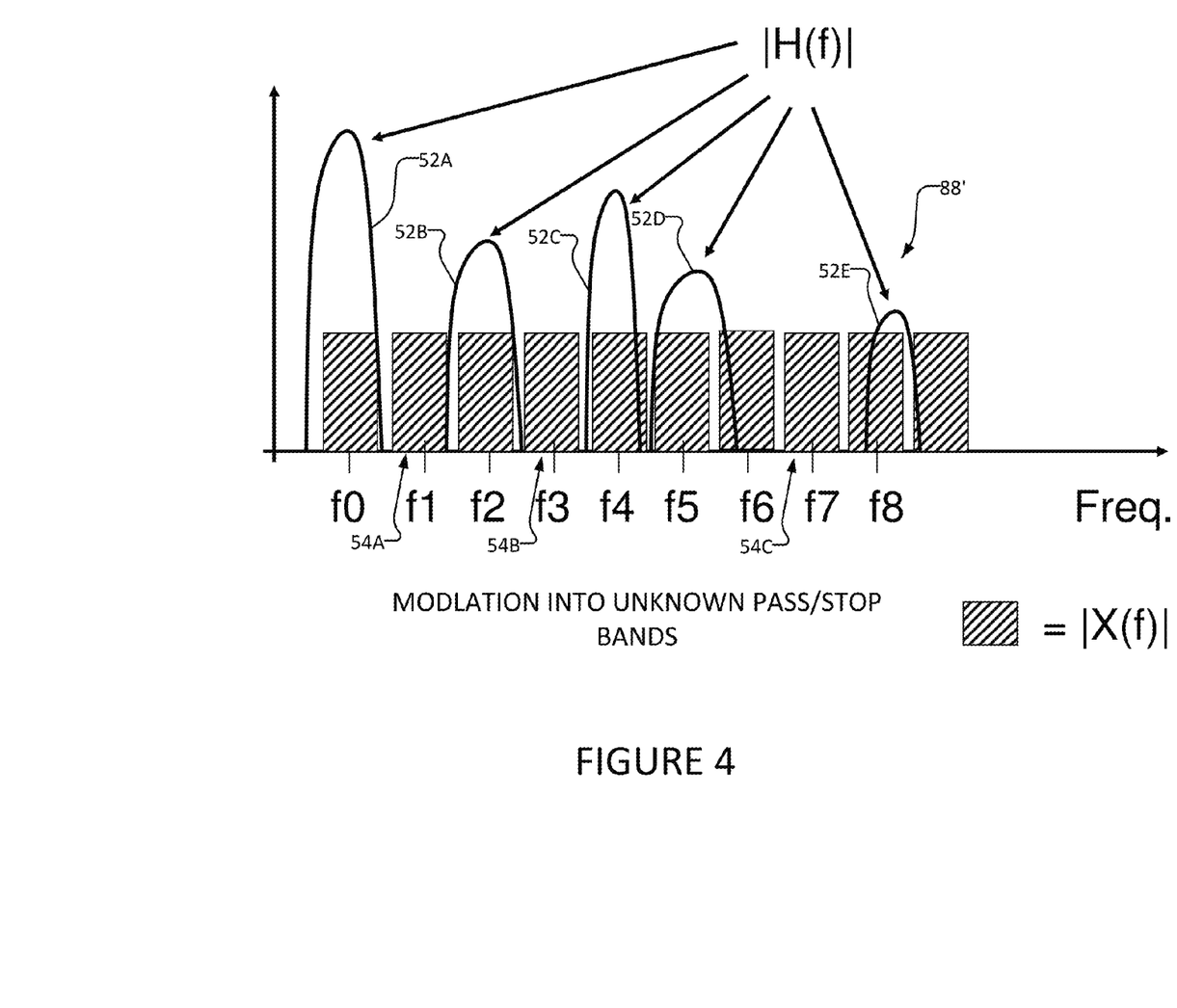
FIG. 4 is a schematic depiction of an acoustic channel having pass-bands and stop-bands representative of the acoustic channel of a pipe string and how a transmitter (e.g. one of transmitters of FIGS. 1 and 2) can map sub-channels and sub-bands into the channel where the transmitter has limited or no knowledge of the frequency-domain locations of the pass-bands.

FIG. 4 is a schematic depiction of an acoustic channel 88' having pass-bands 52A-52E (collectively, pass-bands 52) and stop-bands 54A-54D (collectively, stop-bands 54) representative of the acoustic channel 88' of a pipe string 100 and how a transmitter (e.g. one of transmitters 20, 20' described herein) can map sub-channels and sub-bands into channel 88' where the transmitter 20 has no knowledge of the frequency-domain locations of pass-bands 52 or has known estimates of the frequency-domain locations of pass-bands 52 but such estimates are not known with accuracy or precision. Such circumstances may arise, by way of non-limiting example, in applications or embodiments where the acoustic properties of channel 88' (e.g. drill string 100) are not known with sufficient knowledge to estimate the locations of pass-bands 52 or at all, or where the acoustic properties of drill string 100 and channel 88' are likely to change (e.g. during drill operation) or where no feedback communication link is available. In some embodiments, where communication system 50 is deployed in these circumstances, transmitter 20 may use a round robin (or other suitable variable allocation scheme) to communicate data. FIG. 4 shows an example embodiment, where transmitter 20 makes use of a collection of nine configurable sub-bands (f0 . . . f8). Tables 3 and 4 show an example utilization of the nine acoustic sub-bands (f0 . . . f8) by four data sub-channels in accordance with a round robin allocation.

By appropriate round-robin rotation (or other variable allocation scheme) of the sub-channels among sub-bands at transmitter 20, it is possible to successfully receive data from each tool (or field) at receiver 26 in due time, even though the frequency-domain locations of pass-bands 52 of acoustic channel 88' (e.g. pipe string) are not known or the known estimates of the frequency-domain locations of pass-bands 52 are not known with accuracy or precision. An example of such a rotating allocation scheme is illustrated in Tables 3 and 4.

Referring to Table 3, an example frame includes four fields, with reference mnemonics M, I, A, and V. Referring to FIG. 4, f0, f2, f4, f5, f8 are potential sub-band frequencies corresponding (at least roughly) to available pass-bands 52, of which f0 and f2 are utilized in the example transmission of Tables 3 and 4. Transmissions in sub-bands f1 and f3 occur as well, but the center frequencies of sub-bands f1 and f3 correspond to stop-bands 54 of channel 88', yielding no workable reception at receiver 26. Referring to Table 4, during transmission of a first frame (Frame 0) each field is assigned a sub-band. In the example shown in FIGS. 3 and 4, the Management field M is assigned to sub-band f0, the Incline field I is assigned to sub-band f1, the Azimuth field A is assigned to sub-band f2 and the Vibration field V is assigned to sub-band f3.

TABLE 3

An Example Frame Composition

| Field | Frame bit numbers | Field Mnemonic |
|---|---|---|
| Management (12 bits) | b0 . . . b11 | M |
| Incline (10 bits) | b12 . . . b21 | I |

TABLE 3-continued

An Example Frame Composition

| Field | Frame bit numbers | Field Mnemonic |
|---|---|---|
| Azimuth (9 bits) | b22 ... b30 | A |
| Vibration (7 bits) | b31 ... b37 | V |

TABLE 4

Round Robin Allocation of Frame Fields to Sub-bands

| | f0 | f1 | f2 | f3 | Received in a pass-band (FIG. 4)? |
|---|---|---|---|---|---|
| Frame 0 | M | I | A | V | M & A |
| Frame 1 | I | A | V | M | I & V |
| Frame 2 | A | V | M | I | A & M |
| Frame 3 | V | M | I | A | V & I |
| Frame 4 | M | I | A | V | M & A |
| | | | | | Etc ... |

In the example of FIG. 4 and Tables 3 and 4, it is assumed that transmitter 20 does not know which sub-bands are seen as pass-bands by uphole receiver 26. To enable a successful reception for all tool/sensor data at receiver 26, in a second frame (Frame 1), transmitter 20 shuffles the sub-band allocations: the Management field M is assigned to sub-band f3, the Incline field I is assigned to sub-band f0, the Azimuth field A is assigned to sub-band f1 and the Vibration field V is assigned to sub-band f2. The right most column of Table 4 summarizes which fields are successfully received by uphole receiver 26 for each frame, assuming that channel 88' has the frequency domain characteristics shown in the FIG. 4 example channel 88'. At frame 0, the Management and Azimuth fields (M, A) are received successfully. At frame 1, the Incline and Vibration fields (I, V) are received successfully. In this manner, within a time window of two frames, updated data from all tools (fields) has been successfully received at receiver 26. Using the parameters of the OFDM example described above, if a frame is updated with every OFDM symbol, all 38 bits of field data of the example will be updated within a time window of 1.2 s.

In many MWD applications, it is permissible to drop (lose) an individual reading from a tool/sensor, as long as the same reading (or a more recent reading) is eventually received within a desired time window.

Particular embodiment take advantage of pass-bands 52 in acoustic channel 88', without prior knowledge of the frequency-domain locations of such pass-bands 52 or with inaccurate or imprecise estimates of the frequency-domain locations of such pass-bands 52, by modulating tool/sensor data from independent data sub-channels into different acoustic sub-bands and then using round robin or other allocation shuffling techniques to provide diversity to ensure that eventually all tool/sensor data passes through one, some or all pass-bands 52.

Data interleaving and/or error coding may additionally or alternatively be employed to provide additional protection against noise, and yield a net coding gain that translates to a further drill depth up to which data may be successfully decoded, compared to a communication link where MWD tool data is modulated without coding.

Table 5 illustrates an example of another sub-band allocation technique, which may be employed by downhole transmitter 20 in some embodiments. In the Table 5 technique, sub-bands f0 to f8 are utilized, but not all at the same time. By a sparse utilization of the available sub-bands, a high transmission power per sub-band may be maintained, while taking advantage of a wider range of sub-bands. The Table 5 example comprises application of a round robin variable allocation scheme combined with a skip-one sparse-allocation scheme: four fields M, I, A and V are assigned to four sub-bands with a skip-one (i.e. one skipped sub-band) between the sub-bands corresponding to each field. In frame 0, the fields M, I, A and V respectively occupy sub-bands f0, f2, f4 and f6. In a next frame (frame 1), the allocation is rotated while an offset is also applied, thus fields I, A, V and M (a rotation of M, I, V, A) are assigned to sub-bands f1 (offset from f0 by one), f3, f5 and f7.

TABLE 5

Illustration of Sparse Round Robin Allocation

| | f0 | f1 | f2 | f3 | F4 | f5 | f6 | f7 | f8 | f9 | Received in a pass-band (FIG. 4)? |
|---|---|---|---|---|---|---|---|---|---|---|---|
| Pass/Stop | pass | stop | pass | stop | pass | pass | stop | stop | pass | stop | |
| Frame 0 | M | | I | | A | | V | | | | M, I, A |
| Frame 1 | | I | | A | | V | | M | | | V |
| Frame 2 | | | A | | V | | M | | I | | A, V, I |
| Frame 3 | | | | V | | M | | I | | A | M |
| Frame 4 | V | | | | M | | I | | A | | V, M, A |
| | | | | | | | | | | | Etc ... |

Table 6 illustrates an example of another sub-band allocation technique, which may be employed by downhole transmitter 20 in some embodiments. In the Table 6 technique, the available transmit power may be concentrated in one sub-band to achieve successful reception from a deeper downhole transmission location. It is well known in the field of communications that the transmitted power is distributed over the spectral width of the transmission signal. Given a fixed total launch power (e.g. of the electro-mechanical transducer(s) used to establish an acoustic signal), if a transmission is made into one sub-band rather then M sub-bands, then the transmitted power in that one sub-band can be M times higher than in the case of a transmission in M sub-bands. Table 6 illustrates an example of another transmission technique, where power is concentrated into one sub-band and a round robin rotation allocates sub-channel data to different sub-bands.

TABLE 6

Illustration of Sparse Round Robin Allocation

| | f0 | f1 | f2 | f3 | F4 | f5 | f6 | f7 | f8 | f9 | Received in a pass-band (FIG. 4)? |
|---|---|---|---|---|---|---|---|---|---|---|---|
| Pass/Stop | pass | stop | pass | stop | pass | pass | stop | stop | pass | stop | |
| Frame 0 | M | | | | | | | | | | M |
| Frame 1 | | I | | | | | | | | | None |
| Frame 2 | | | A | | | | | | | | A |
| Frame 3 | | | | V | | | | | | | None |
| Frame 4 | | M | | | | | | | | | None |
| Frame 5 | | | I | | | | | | | | I |
| Frame 6 | | | | A | | | | | | | None |
| Frame 7 | | | | | V | | | | | | V |
| | | | | | | | | | | | Etc. |

Tables 7 and 8 illustrate examples of other sub-band allocation techniques, which may be employed by downhole transmitter 20 and uphole receiver 26 in some embodiments. In the technique of Tables 7 and 8, longer reach (e.g. transmission from a greater downhole depth) may be achieved by increasing the energy per transmitted bit. Where available transmit launch power available to transmitter 20 is limited, some embodiments may comprise increasing the energy per transmitted bit by transmitting data from transmitter 20 over a longer time period (e.g. transmitting the same bit(s) an integer number of times or for an integer number of symbol periods); and attempting multiple times during a corresponding time period to discriminate the data received at receiver 26. For example, by doubling the transmission time per bit at transmitter 20, the transmitted energy per bit is doubled, boosting it by 3 dB, which may yield a 3 dB boost in the signal to noise ratio (SNR) at uphole receiver 26. In some embodiments, this kind of doubling (or some other multiple) can be accomplished in combination with a round robin allocation, as illustrated in Tables 7 and 8.

Transmitted energy can be doubled by transmitting data bits from a same tool/sensor reading twice or by doubling the modulated symbol duration. In OFDM, the latter is accomplished by doubling the OFDM symbol duration. This can be accomplished in OFDM by doubling the IFFT size, or simply replicating the output of the IFFT, but it is not necessary to increase the number of utilized or active sub-carriers. While the examples described herein, double the OFDM symbol duration or transmit the same bits twice, it will be appreciated that these concepts can be extended to any suitable integer such that the transmitted energy per bit may be tripled, quadrupled, or more, providing further improvement to receiver SNR.

Repeat transmission to increase the energy per transmitted bit can be made in a same sub-band (as shown in Table 7) or can be made in combination with rotating sub-bands (as shown in Table 8). Uphole receiver 26 may apply suitable combining of repeated transmissions if all occur in one sub-band. The receiver may apply diversity combining, such as maximum ratio combining (MRC), between several receptions of a sub-banded transmission if the same modulated symbol is transmitted in different sub-bands at different times. In the case of an OFDM transmission, MRC may be applied to the FFT output of the receiver.

TABLE 7

Illustration of Energy duplication combined with Sparse Round Robin Allocation

| | f0 | f1 | f2 | f3 | F4 | f5 | f6 | f7 | f8 | f9 | Received in a pass-band (FIG. 4)? |
|---|---|---|---|---|---|---|---|---|---|---|---|
| Pass/Stop | pass | stop | pass | stop | pass | pass | stop | stop | pass | stop | |
| Frame 0 | M | | I | | A | | V | | | | M, I, A |
| Frame 0, duplicate | M | | I | | A | | V | | | | M, I, again |
| Frame 1 | | I | | A | | V | | M | | | V |
| Frame 1, duplicate | | I | | A | | V | | M | | | V again |
| Frame 2 | | | A | | V | | M | | I | | A, V, I |
| Frame 2, duplicate | | | A | | V | | M | | I | | A, V, I again |
| | | | | | | | | | | | Etc . . . |

TABLE 8

Illustration of Energy duplication combined with Sparse Round Robin Allocation and Sub-band Diversity

| | f0 | f1 | f2 | f3 | F4 | f5 | f6 | f7 | f8 | f9 | Received in a pass-band (FIG. 4)? |
|---|---|---|---|---|---|---|---|---|---|---|---|
| Pass/Stop | pass | stop | pass | stop | pass | pass | stop | stop | pass | stop | |
| Frame 0 | M | | I | | A | | V | | | | M, I, A |
| Frame 0, duplicate | | M | | I | | A | | V | | | Apply MRC to A |
| Frame 1 | | I | | A | | V | | M | | | V |
| Frame 1, duplicate | | | I | | A | | V | | M | | |
| | | | | | | | | | | | Etc . . . |

Many of the above-described techniques are non-exclusive to one another. In some embodiments, two or more of such techniques may be combined. For example, sub-band diversity (use of sparse sub-band allocation schemes), energy duplication and round robin allocation are independent of and non-exclusive to one another. In some embodiments, each of these techniques may be applied independently without the other or any combination or sub-combination of these techniques may be applied. A round robin technique allocates tool/sensor data to different sub-bands. An energy duplication technique increases the transmission energy of a data bit by extending the period of the modulated symbol. Sub-band diversity provides a repeated transmission of a modulated symbol in different sub-bands. In addition to these techniques, the total transmit power may be boosted to transmit with even more energy per data bit.

In some embodiments, two or more of these techniques may be combined. Round robin allocation with energy duplication and diversity implies that data from a specific tool/sensor is allocated to a sub-band, and therein the data is transmitted with a repeated symbol period, after which the same data is retransmitted at a different sub-band, again with a repeated symbol period. Transmit power boosting may be applied as well.

Uphole receiver 26 may have knowledge of the variable allocation, the sub-band diversity scheme and the energy duplication scheduling, and may buffer the first received symbol from a specific data field. Then, the second symbol from a repeated transmission in the same sub-band may be combined with the first symbol (e.g. arithmetically summed to the first symbol).

Uphole receiver 26 may also have knowledge of the diversification scheduling, and may calculate a second sum of two repeat transmissions (now obtained from two different sub-bands). Then, the two sums, each from a different sub-band, may then be combined using maximum ratio combining to result in one final received symbol.

In the case of OFDM with QPSK modulation, the summing may be performed before a Frequency Domain Equalizer, and the MRC may be performed after the equalizer. In a subsequent step the QPSK symbol may be de-mapped to a pair of data bits.

While a number of exemplary aspects and embodiments are discussed herein, those of skill in the art will recognize certain modifications, permutations, additions and sub-combinations thereof. For example:

Except as where described herein or where otherwise dictated by the context, the features of transmitter 20' (FIG. 2B) may be similar to those described above in connection with transmitter 20 and transmitter 20' may be used in the place of transmitter 20 in communication system 50.

In the description, various techniques (e.g. variable allocation, energy duplication, sub-band diversity and the like) are described as being used by communication system 50 when estimates of the frequency-domain locations of pass-bands are not known to transmitter 20 or are such estimates are not known with accuracy or precision. In general, such techniques may be used even where transmitter 20 has access to estimates of the frequency-domain locations of pass-bands.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations.

What is claimed is:

1. A method for transmitting data in a frequency selective communication channel having pass-bands and stop-bands, the method comprising:
    parsing data to be transmitted into a plurality of data fields;
    assigning the data from each data field into a corresponding one of a plurality of sub-channels;
    modulating the data from each of the plurality of sub-channels into a corresponding one of a plurality of sub-bands, the plurality of sub-bands having spaced apart center frequencies; and
    concurrently transmitting the data from the plurality of sub-bands onto the channel;
    wherein parsing data to be transmitted into a plurality of data fields comprises receiving data from a plurality of data sources and assigning the data from each one of the corresponding data sources into a corresponding one of the data fields.

2. A method according to claim 1 wherein each of the plurality of data sources comprises a corresponding tool; and a corresponding sensor.

3. A method according to claim 1 wherein receiving data from a plurality of data sources comprises receiving data frames, each data frame comprising data from the plurality of data sources and wherein assigning data from each one of the corresponding data sources into the corresponding one of the data fields comprises parsing each data frame to assign one or more bits of the data frame into each data field.

4. A method according to claim 1 wherein the plurality of sub-bands are spaced apart from one another in the frequency domain.

5. A method according to claim 1 wherein concurrently transmitting the data from the plurality of sub-bands onto the channel comprises transmitting acoustic energy over the channel.

6. A method for transmitting data in a frequency selective communication channel having pass-bands and stop-bands, the method comprising:
  parsing data to be transmitted into a plurality of data fields;
  assigning the data from each data field into a corresponding one of a plurality of sub-channels;
  modulating the data from each of the plurality of sub-channels into a corresponding one of a plurality of sub-bands, the plurality of sub-bands having spaced apart center frequencies; and
  concurrently transmitting the data from the plurality of sub-bands onto the channel;
  wherein parsing data to be transmitted into a plurality of data fields comprises receiving data from a plurality of data sources and assigning an equal number of data bits to each data field, independently of the data source from which the data bits originate.

7. A method according to claim 6 wherein the plurality of sub-bands are spaced apart from one another in the frequency domain.

8. A method for transmitting data in a frequency selective communication channel having pass-bands and stop-bands, the method comprising:
  parsing data to be transmitted into a plurality of data fields;
  assigning the data from each data field into a corresponding one of a plurality of sub-channels;
  modulating the data from each of the plurality of sub-channels into a corresponding one of a plurality of sub-bands, the plurality of sub-bands having spaced apart center frequencies; and
  concurrently transmitting the data from the plurality of sub-bands onto the channel;
  wherein modulating the data from each of the plurality of sub-channels into its corresponding one of the plurality of sub-bands comprises assigning the center frequency of each sub-band to be within an estimated frequency-domain location of a corresponding pass-band in the channel.

9. A method according to claim 8 wherein assigning the center frequency of each sub-band to be within the estimated frequency-domain location of its corresponding pass-band comprises adjusting the assigned center frequency of each sub-band based on an updated estimated frequency-domain location of its corresponding pass-band.

10. A method according to claim 8 wherein modulating the data from each of the plurality of sub-channels into a corresponding one of the plurality of sub-bands comprises modulating the data for each sub-band at a common data rate.

11. A method according to claim 10 wherein the common data rate is based on the estimated frequency-domain locations of the pass-bands corresponding to each sub-channel.

12. A method according to claim 10 wherein the common data rate is based on an estimated frequency domain width of a narrowest of the pass-bands corresponding to each sub-channel.

13. A method according to claim 10 wherein the common data rate is a based on an average estimated frequency-domain width of the pass-bands corresponding to each sub-channel.

14. A method according to claim 8 comprising receiving, from a receiver across the channel, the estimated frequency-domain locations of the pass-bands in the channel.

15. A method according to claim 9 comprising receiving, from a receiver across the channel, the updated estimated frequency-domain locations of the pass-bands in the channel.

16. A method according to claim 8 wherein the estimated frequency-domain locations of the pass-bands in the channel are based, at least in part, on empirical data associated with the channel.

17. A method for transmitting data in a frequency selective communication channel having pass-bands and stop-bands, the method comprising:
  parsing data to be transmitted into a plurality of data fields;
  assigning the data from each data field into a corresponding one of a plurality of sub-channels;
  modulating the data from each of the plurality of sub-channels into a corresponding one of a plurality of sub-bands, the plurality of sub-bands having spaced apart center frequencies; and
  concurrently transmitting the data from the plurality of sub-bands onto the channel;
  wherein, after a first iteration comprising the steps of assigning the data, modulating the data and concurrently transmitting the data, the method comprises, for each of one or more successive iterations:
    assigning the data from the plurality of data fields into the plurality of sub-channels using a variable allocation scheme comprising assigning the data from each data field into a different corresponding one of the plurality of sub-channels for each of the one or more successive iterations;
    modulating the data from each of the plurality of sub-channels into its corresponding one of the plurality of sub-bands;
    concurrently transmitting the data from the plurality of sub-bands onto the channel.

18. A method according to claim 17 wherein the variable allocation scheme comprises a round robin allocation scheme wherein a number of iterations in the first iteration and the one or more successive iterations is equal to a number of sub-channels in the plurality of sub-channels and, wherein over the first iteration and the one or more successive iterations, data from each data field is assigned once to each sub-channel.

19. A method for transmitting data in a frequency selective communication channel having pass-bands and stop-bands, the method comprising:
  parsing data to be transmitted into a plurality of data fields;
  assigning the data from each data field into a corresponding one of a plurality of sub-channels;
  modulating the data from each of the plurality of sub-channels into a corresponding one of a plurality of sub-bands, the plurality of sub-bands having spaced apart center frequencies;
  concurrently transmitting the data from the plurality of sub-bands onto the channel; and
  repeating the steps of assigning the data, modulating the data and concurrently transmitting the data over one or more successive iterations, wherein, in each successive iteration, the step of assigning the data comprises using a variable allocation scheme comprising assigning the data from each data field into a different corresponding one of the plurality of sub-channels for each successive iteration.

20. A method according to claim 19 wherein the plurality of sub-bands are spaced apart from one another in the frequency domain.

21. A method according to claim 19 wherein the channel comprises a plurality of pass-bands and a plurality of stop-bands.

22. A method according to claim 19 wherein concurrently transmitting the data from the plurality of sub-bands onto the channel comprises transmitting acoustic energy over the channel.

23. A method according to claim 22 wherein transmitting acoustic energy over the channel comprises transmitting acoustic energy over a drill string.

24. A method according to claim 21 wherein transmitting acoustic energy over the channel comprises transmitting data limited to frequencies below a natural resonant frequency of a mechanical acoustic transmission system used to transmit the acoustic energy.

25. A method according to claim 19 wherein modulating the data from each of the plurality of sub-channels into its corresponding one of the plurality of sub-bands comprises using an orthogonal frequency division multiplexing (OFDM) scheme wherein, for each sub-channel, a plurality of bits from the sub-channel are modulated concurrently onto orthogonal acoustic sub-carriers having sub-carrier frequencies within the sub-band corresponding to the sub-channel.

26. A method for transmitting data in a frequency selective communication channel having pass-bands and stop-bands, the method comprising:
    parsing data to be transmitted into a plurality of data fields;
    assigning the data from each data field into a corresponding one of a plurality of sub-channels;
    modulating the data from each of the plurality of sub-channels into a corresponding one of a plurality of sub-bands, the plurality of sub-bands having spaced apart center frequencies; and
    concurrently transmitting the data from the plurality of sub-bands onto the channel;
    wherein a number of available sub-bands is greater than a number of the plurality of sub-bands and, after a first iteration comprising the steps of assigning the data, modulating the data and concurrently transmitting the data, the method comprises:
    for each of one or more successive iterations:
        modulating the data from each of the plurality of sub-channels into a corresponding one of a current-iteration plurality of sub-bands from among the available sub-bands;
        concurrently transmitting the data from the current-iteration plurality of sub-bands onto the channel;
    after the first iteration and the one or more successive iterations, repeating the first iteration and the one or more successive iterations in each of one or more successive loops, wherein repeating the first iteration and the one or more successive iterations in each of one or more successive loops comprises using a variable allocation scheme implemented over the one or more successive loops to vary the modulation of the data from the plurality of sub-channels into the available sub-bands.

27. A method for transmitting data in a frequency selective communication channel having pass-bands and stop-bands, the method comprising:
    parsing data to be transmitted into a plurality of data fields;
    assigning the data from each data field into a corresponding one of a plurality of sub-channels;
    modulating the data from each of the plurality of sub-channels into a corresponding one of a plurality of sub-bands, the plurality of sub-bands having spaced apart center frequencies; and
    concurrently transmitting the data from the plurality of sub-bands onto the channel;
    wherein a number of available sub-bands is greater than a number of the plurality of sub-bands and, after a first iteration comprising the steps of assigning the data, modulating the data and concurrently transmitting the data, the method comprises, for each of one or more successive iterations:
        modulating the data from each of the plurality of sub-channels into a corresponding one of a current-iteration plurality of sub-bands from among the available sub-bands;
        concurrently transmitting the data from the current-iteration plurality of sub-bands onto the channel; and
    receiving signals corresponding to each of the first iteration and the one or more successive iterations and combining the received signals from the first iteration and the one or more successive iterations to discriminate a single set of received data.

28. A method according to claim 27 wherein combining the received signals from the first iteration and the one or more successive iterations to discriminate a single set of received data comprises using a maximum ratio combining (MRC) technique.

29. A method according to claim 28 wherein modulating the data from each of the plurality of sub-channels into its corresponding one of the plurality of sub-bands comprises using an orthogonal frequency division multiplexing (OFDM) scheme and wherein using the maximum ratio combining (MRC) technique comprises applying the maximum ratio combining (MRC) technique to the output of a fast Fourier transform (FFT) process.

* * * * *